(12) United States Patent
Lin et al.

(10) Patent No.: US 9,465,973 B1
(45) Date of Patent: Oct. 11, 2016

(54) ENHANCED CAPACITIVE FINGERPRINT SENSING UNIT

(71) Applicant: SunASIC Technologies, Inc., New Taipei (TW)

(72) Inventors: Chi-Chou Lin, New Taipei (TW); Zheng-Ping He, Taipei (TW)

(73) Assignee: Sunasic Technologies, Inc., New Taipei (TW)

( * ) Notice: Subject to any disclaimer, the term of this patent is extended or adjusted under 35 U.S.C. 154(b) by 61 days.

(21) Appl. No.: 14/662,561

(22) Filed: Mar. 19, 2015

(51) Int. Cl.
*G06K 9/00* (2006.01)

(52) U.S. Cl.
CPC ......... *G06K 9/0002* (2013.01); *G06K 9/00033* (2013.01)

(58) Field of Classification Search
None
See application file for complete search history.

(56) References Cited

U.S. PATENT DOCUMENTS

| | | | | |
|---|---|---|---|---|
| 7,545,016 B2* | 6/2009 | Holz | ................. | H01L 27/14636 257/294 |
| 7,687,839 B2* | 3/2010 | Thomas | ............. | G06K 9/00053 257/296 |
| 8,633,525 B2* | 1/2014 | Thomas | ............. | G06K 9/00053 257/296 |
| 8,963,312 B2* | 2/2015 | Ho | .......................... | H01L 24/49 257/686 |
| 9,008,376 B2* | 4/2015 | Chiu | .................. | G06K 9/00013 382/124 |
| 2014/0332968 A1* | 11/2014 | Ho | .................... | H01L 23/49805 257/773 |
| 2016/0123775 A1* | 5/2016 | Chen | ........................ | G01D 5/24 324/663 |
| 2016/0154989 A1* | 6/2016 | Lin | .................... | G06K 9/00013 382/124 |

\* cited by examiner

*Primary Examiner* — Soo Park
(74) *Attorney, Agent, or Firm* — Che-Yang Chen; Law Offices of Scott Warmuth

(57) ABSTRACT

An enhanced capacitive fingerprint sensing unit is disclosed. The enhanced capacitive fingerprint sensing unit includes a base structure and a fingerprint sensing structure. The fingerprint sensing structure has a first inter-metal dielectric layer, a second metal layer, a second inter-metal dielectric layer, a third metal layer, and a passivation layer. By connecting the third metal layer to Transient Voltage Suppressor (TVS) device, anti-Electrostatic Discharge (ESD) is available. By increasing the thicknesses of the first inter-metal dielectric layer and the second inter-metal dielectric layer, sensitivity of the enhanced capacitive fingerprint sensing unit can be improved.

9 Claims, 8 Drawing Sheets

ENHANCED CAPACITIVE FINGERPRINT SENSING UNIT

FIELD OF THE INVENTION

The present invention relates to a fingerprint sensing unit. More particularly, the present invention relates to an enhanced capacitive fingerprint sensing unit.

BACKGROUND OF THE INVENTION

There are many human physiological characteristics which can be used to provide personnel identification for security purposes, such as fingerprint, retina, iris, DNA, or even face features. For all the devices that are capable of distinguishing some physiological characteristic of one person from others', a fingerprint reader has the lowest cost and complexity, while the identification results are generally pretty good. In addition, the size of data required to store the minutiae of one fingerprint is small (ranging from 120 bytes to 2K bytes). This makes fingerprint identification devices widely accepted in many fields.

There are also many types of sensing techniques for capturing fingerprint. The popular ones are optical type and capacitive type. Optical fingerprint sensing modules utilize reflected light intensity from the surface of a finger to tell where the ridges and valleys are on the contact portion of the finger. The advantage of the optical technique is reliability and low cost. However, due to the size of the embedded optical lens, the form factor of a optical fingerprint sensing module cannot be kept small. It is difficult for the optical type sensor to be embedded in portable devices. The capacitive type fingerprint identification modules, on the other hand, are made out of silicon chips and can be made very compact. In some cases, when a fingerprint image can be fetched by slide scanning, the fingerprint sensor can be even thin and slim, too. The small form factor of capacitive type fingerprint identification module makes it suitable for portable applications such as access control badges, bank cards, cellular phones, tablet computers, USB dongles, etc.

Capacitive fingerprint sensor is based on the physics principle that the capacitance of a two parallel metal plates capacitor is inversely proportional to the distance between two plates. A capacitive fingerprint sensor consists of an array of sensing units. Each sensing unit contains a sensing plate. By using the sensing plate as one plate of the two-plated capacitor and a dermal tissue as another plate, ridges and valleys of a finger can be located by measuring the different capacitances. There are many prior arts related to the capacitive type fingerprint identification module. For example, the U.S. Pat. No. 6,114,862 discloses a distance sensor. It has a capacitive element in turn having a first capacitor plate which is positioned facing a second capacitor plate whose distance is to be measured. In the case of fingerprinting, the second capacitor plate is defined directly by the skin surface of the finger being printed. The sensor includes an inverting amplifier, between the input and output of which the capacitive element is connected to form a negative feedback branch. By supplying an electric charge step to the input of the inverting amplifier, a voltage step directly proportional to the distance being measured is obtained at the output. Although a structure of the sensor is simple, the amplifiers suffer uniformity problem and their energy efficiency is not good.

Another prior art is disclosed in U.S. Pat. No. 7,663,380. Please refer to FIG. 1A and FIG. 1B. A capacitive fingerprint sensor comprises a fingerprint capacitor $C_F$, a reference capacitor $C_S$, a first transistor 33, a second transistor 34, a third transistor 35 and a fourth transistor 36. The fingerprint capacitor $C_F$ has a capacitance that is either a valley capacitance $C_{FV}$ or a ridge capacitance $C_{FR}$. The reference capacitor $C_S$ has a capacitance $C_S$, and $C_{FV} < C_S < C_{FR}$. The first transistor 33 is configured to pre-charge the reference capacitor $C_S$. The second transistor 34 is configured to pre-charge the fingerprint capacitor $C_F$. The third transistor 35 is configured to re-distribute the charges of the reference capacitor $C_S$ and fingerprint capacitor $C_F$. The fourth transistor 36 is configured to output the voltage of the reference capacitor $C_S$ after redistribution.

FIG. 1A further tells the equivalent circuit of the fingerprint sensor in the pre-charge phase. In the pre-charge phase for the fingerprint sensor, the readout select line $C_m$ (not shown) is asserted, the first transistor 33 and the second transistor 34 are enabled, and the voltages $V_A$ and $V_B$ pre-charge the reference capacitor $C_S$ and fingerprint capacitor $C_F$, respectively. FIG. 1B shows the same circuit in the evaluation phase. In the evaluation phase for the fingerprint sensor, a readout select line $C_{m+1}$ is asserted, the third transistor 35 is enabled, and the electrical charges stored in the reference capacitor $C_S$ and fingerprint capacitor $C_F$ are redistributed. At this moment, a scan line is still asserted, the fourth transistor 36 is enabled, and the readout line outputs voltage depending on which portion of the human fingerprint, i.e., ridge or valley is detected. Apparently, the outputs voltage of the readout select line is larger if the ridge is detected, or smaller if the valley is detected. Thus, a fingerprint can be mapped based on the outputted voltages, varied with portions of the finger.

However, in practice, sensitivity of fingerprint sensing devices made by such capacitive fingerprint sensors is not high. When there is a protective layer on the top of the distance sensor, or the distance sensor is packaged in a molding compound, quality of fetched images gets worse.

Therefore, in order to resolve the problems mentioned above, an enhanced capacitive fingerprint sensing unit is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, an enhanced capacitive fingerprint sensing unit is disclosed. The enhanced capacitive fingerprint sensing unit includes: a base structure, having at least one first metal layer and forming a charging circuit and an operating circuit, for alternatively receiving a charging voltage and sharing electric charges from the charging circuit to a capacitance of the operating circuit while stopping receiving the charging voltage, and a fingerprint sensing structure, formed above the base structure, including: a first inter-metal dielectric layer, having a first depth greater than 3 µm; a second metal layer, formed above the first inter-metal dielectric layer and forming a sensing metal plate; a second inter-metal dielectric layer, formed above and around the second metal layer, covering the sensing metal plate and having a second depth greater than 3 µm; a third metal layer, formed above the second inter-metal dielectric layer, forming a rectangle cell with an opening located above the sensing metal plate and connecting to a Transient Voltage Suppressor (TVS) device, for receiving a first voltage and a second voltage; and a passivation layer, covering the third metal layer. A threshold voltage to trigger the TVS device is higher than the first voltage and/or the second voltage. The base structure also shares electric charges from the charging circuit to capacitances of the fingerprint sensing structure while the charging circuit stops receiving the charging voltage.

According to the present invention, a charging capacitor is built in the charging circuit for storing electric charges when the charging voltage is received and a parasitic capacitance exists in the operating circuit, and a cross capacitance is formed between the third metal layer and the sensing metal plate. When a finger approaches the passivation layer, a signal capacitance is formed between the finger and the third metal layer and a finger capacitance is formed between the finger and the sensing metal plate. A sharing switch is formed between the operating circuit and the charging circuit, for switching operations of receiving a charging voltage and that of sharing electric charges. A voltage variation is obtained in the charging circuit when the second voltage takes place and the charging voltage stops being applied and the sharing switch turns on.

When $V_{out}$ is a value of the output voltage, $V_{dd}$ is a value of the charging voltage, $V_1$ and $V_2$ are values of the first and of the second voltage, respectively, $C_r$ is a capacitance value of the charging capacitor, $C_p$ is a value of the parasitic capacitance, $C_f$ is a value of the finger capacitance, and $C_x$ is a value of the cross capacitance, the output voltage is obtained as $$V_{out} = \frac{C_r}{C_p + C_x + C_f + C_r} V_{dd} + \frac{C_f + C_x}{C_p + C_x + C_f + C_r} (V_2 - V_1)$$

Preferably, a discharging switch is formed in the operating circuit, for resetting the voltage of the operating circuit and that of the second metal layer to signal ground when the sharing switch is off.

A method to acquiring a fingerprint using the enhanced capacitive fingerprint sensing units, includes the steps of: turning off the sharing switch to disconnect the charging circuit from the operating circuit; applying the first voltage to the third metal layer and resetting the operating circuit and the second metal layer by turning on the discharging switch; applying the charging voltage to the charging circuit; turning off the discharging switch and the charging switch; turning on the sharing switch and providing the second voltage to replace the first voltage; measuring the output voltage; and translating the output voltage, from each enhanced capacitive fingerprint sensing unit, to a fingerprint image data corresponding to a portion of a user's fingerprint.

In accordance with another aspect of the present invention, a fingerprint sensor includes a number of enhanced capacitive fingerprint sensing units to form a fingerprint sensing array, wherein the same structure of the base structures or the fingerprint sensing structures are adjacent to each other at the same level and the third metal layers of all fingerprint sensing units are connected so that a metal grid is formed.

By connecting the third metal layer to the TVS device, the enhanced capacitive fingerprint sensing units are protected from ESD (Electrostatic Discharge) damage. By increasing the thicknesses of the first inter-metal dielectric layer and the second inter-metal dielectric layer, the parasitic capacitance $C_p$ and the cross capacitance $C_x$ are reduced. According to the $V_{out}$ formula mentioned above, the sensitivity of the enhanced capacitive fingerprint sensing unit is improved.

DETAILED DESCRIPTION OF THE PREFERRED EMBODIMENT

The present invention will now be described more specifically with reference to the following embodiment.

Figures 1A, 1B:
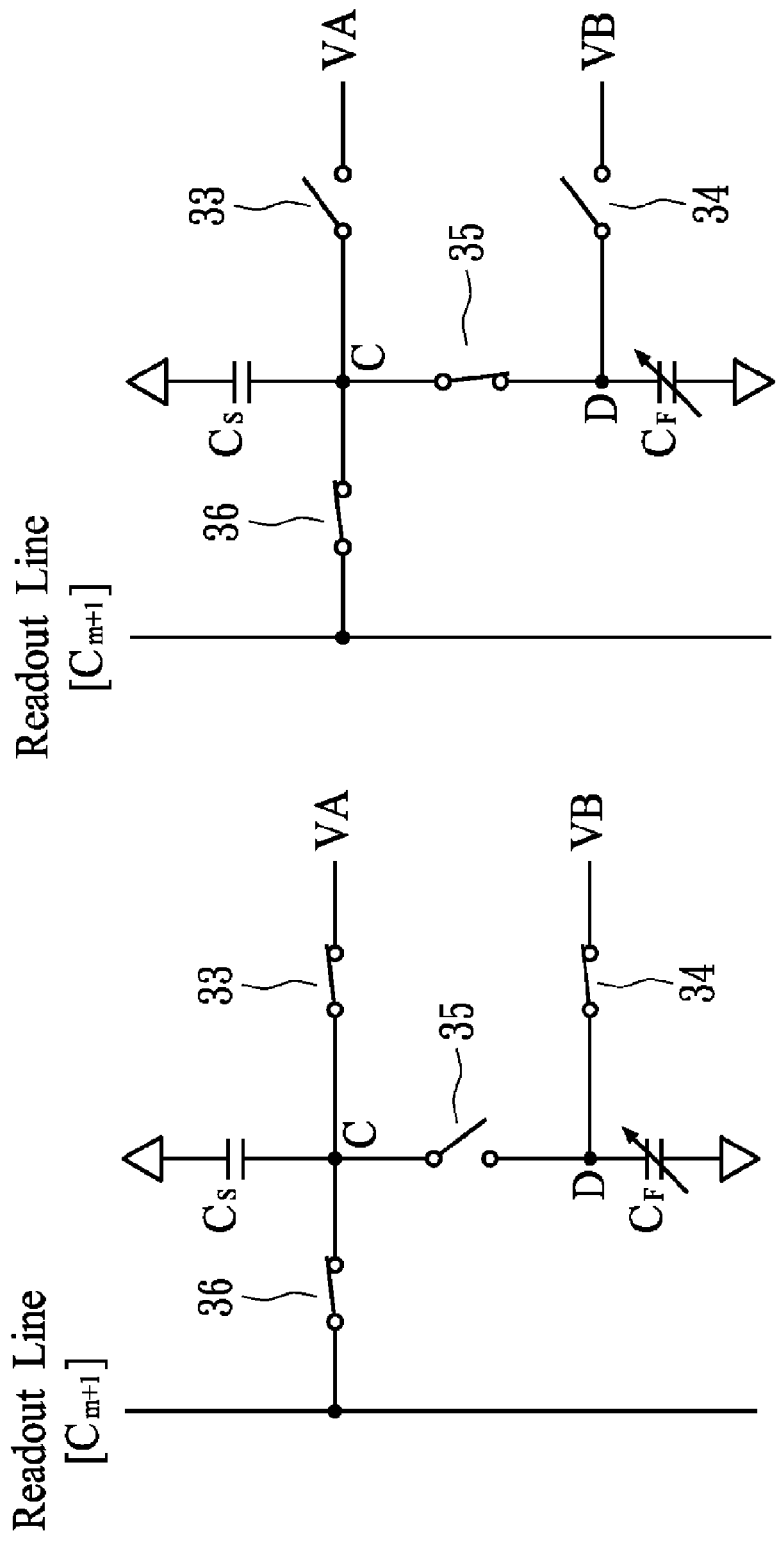
FIG. 1A and FIG. 1B show a conventional fingerprint sensor.
Figure 2:
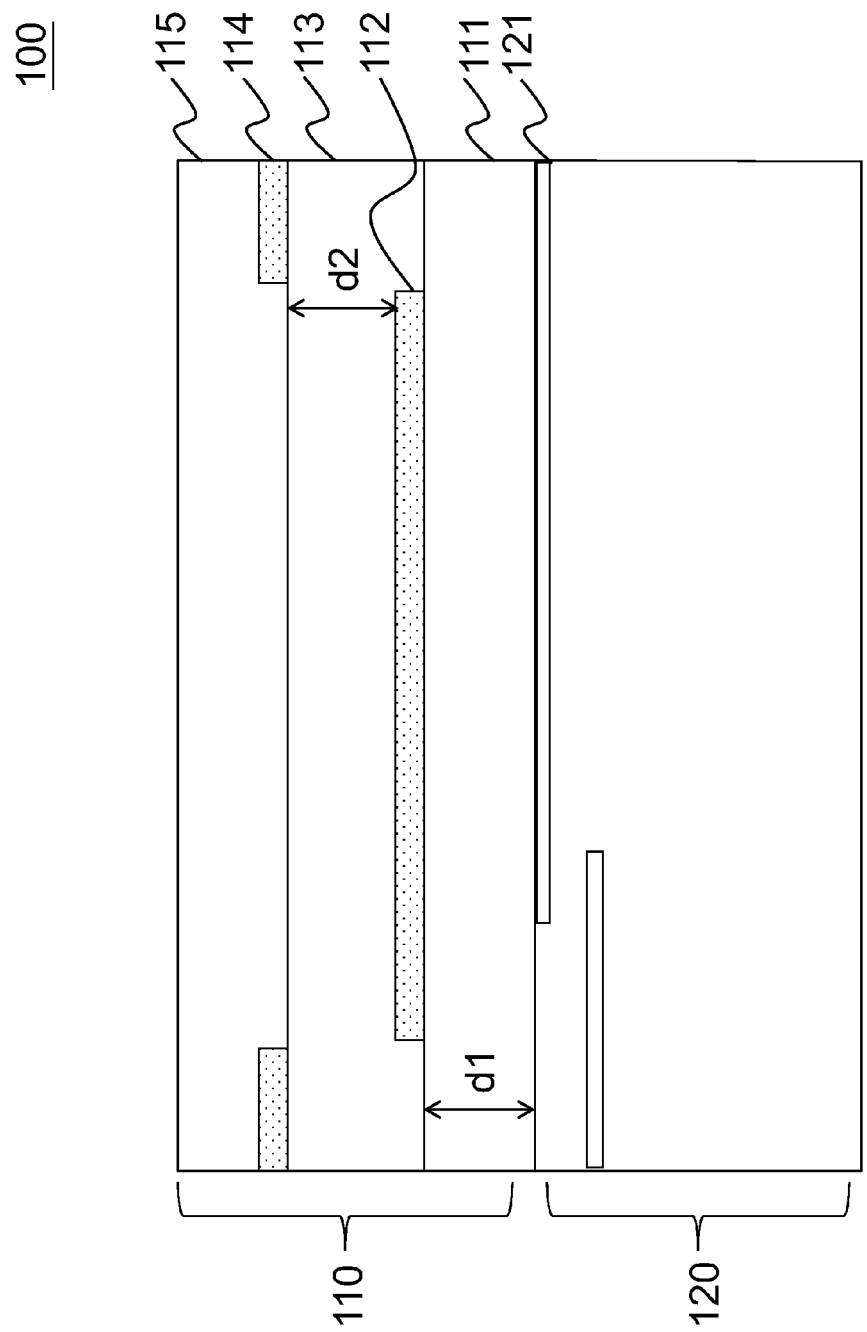
FIG. 2 shows a schematic diagram of an enhanced capacitive fingerprint sensing unit according to the present invention.
Figure 3:
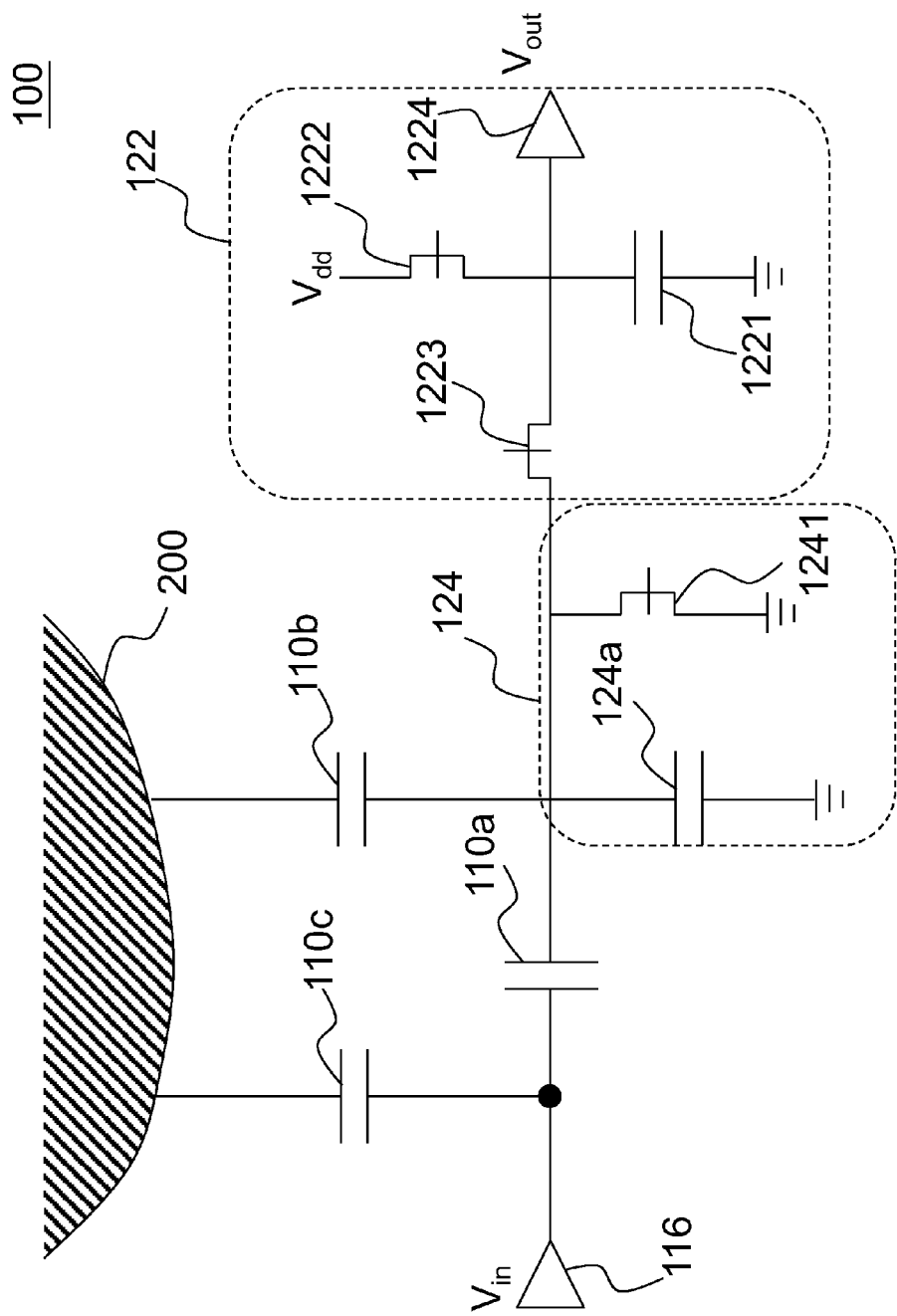
FIG. 3 is an equivalent circuit of the enhanced capacitive fingerprint sensing unit.
Figure 4:
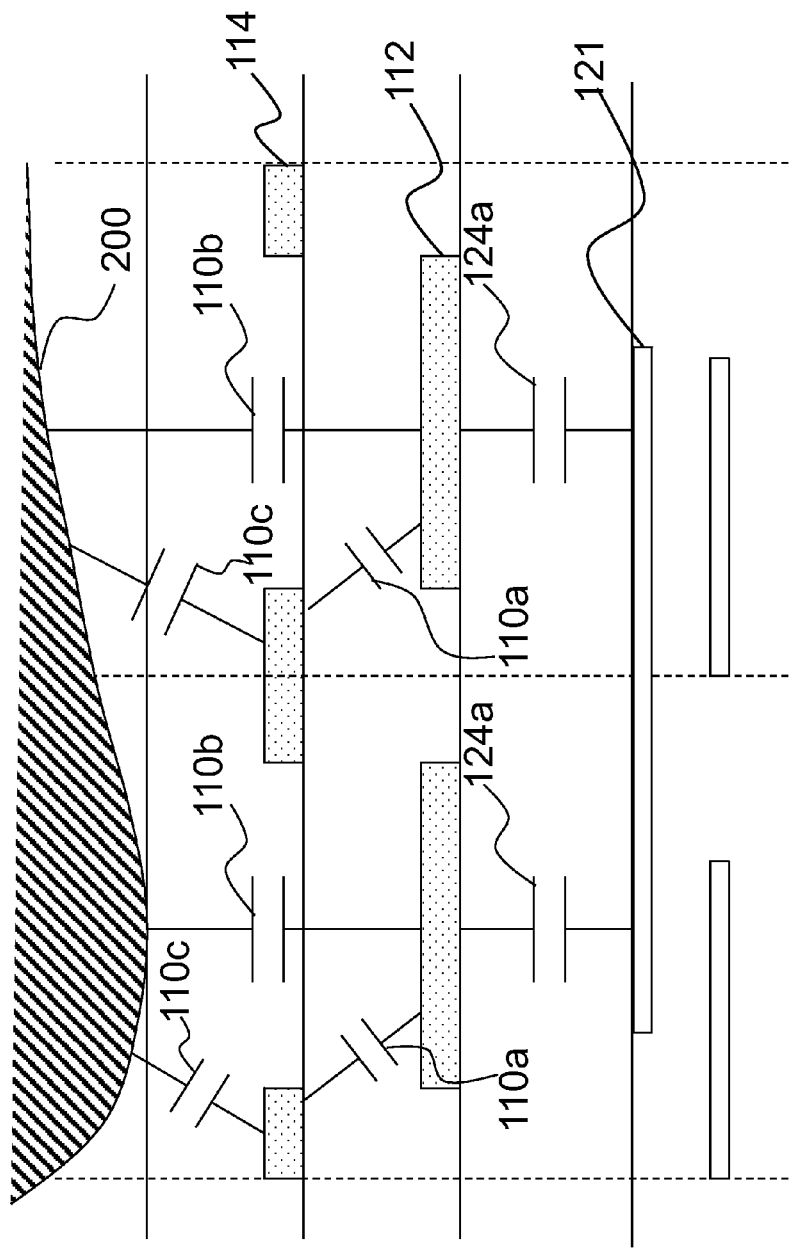
FIG. 4 illustrates the physical structure of two adjacent enhanced capacitive fingerprint sensing unit with a finger put on it and the capacitances formed therein.
Figure 5:
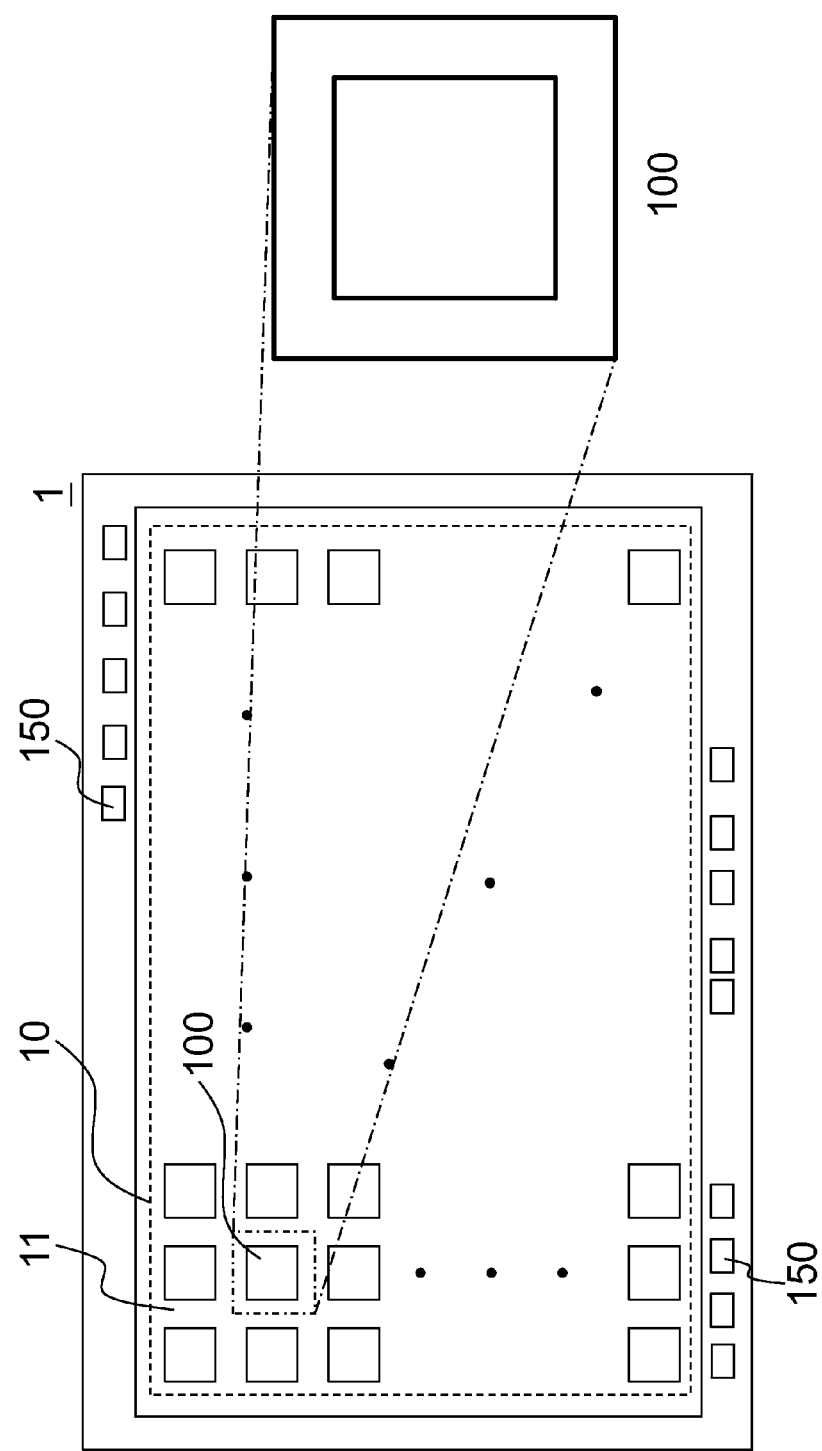
FIG. 5 is a top view of an enhanced capacitive fingerprint sensor.
Figure 6:
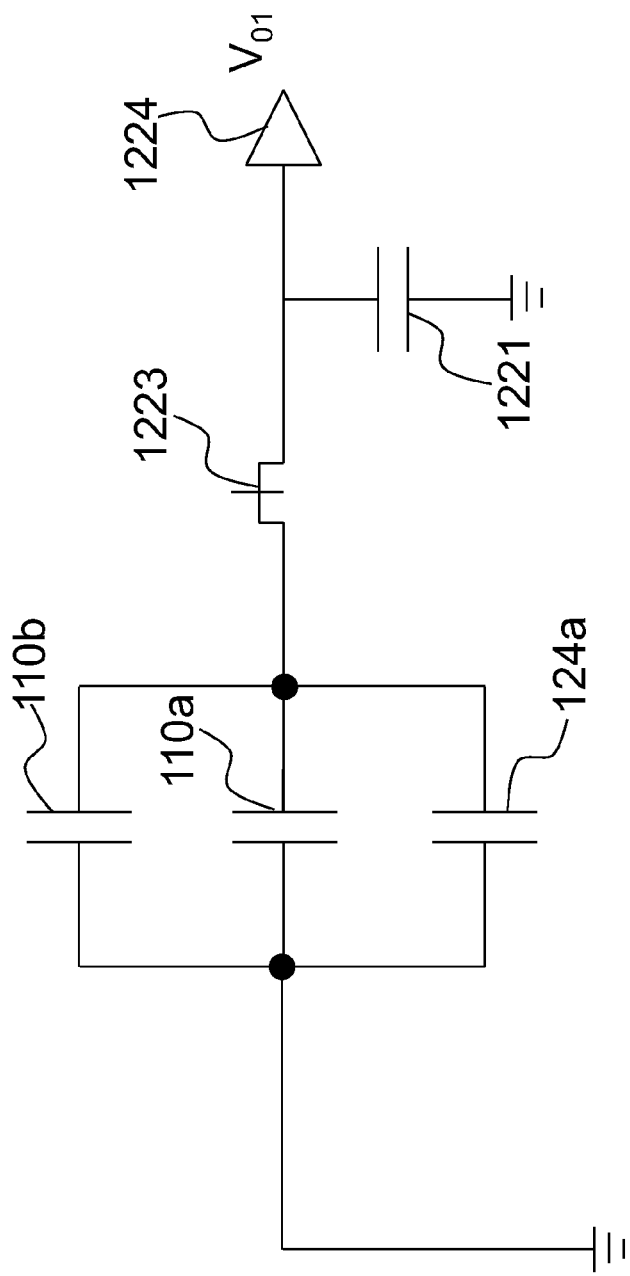
FIG. 6 shows an equivalent circuit for the charge sharing term of the output voltage.
Figure 7:
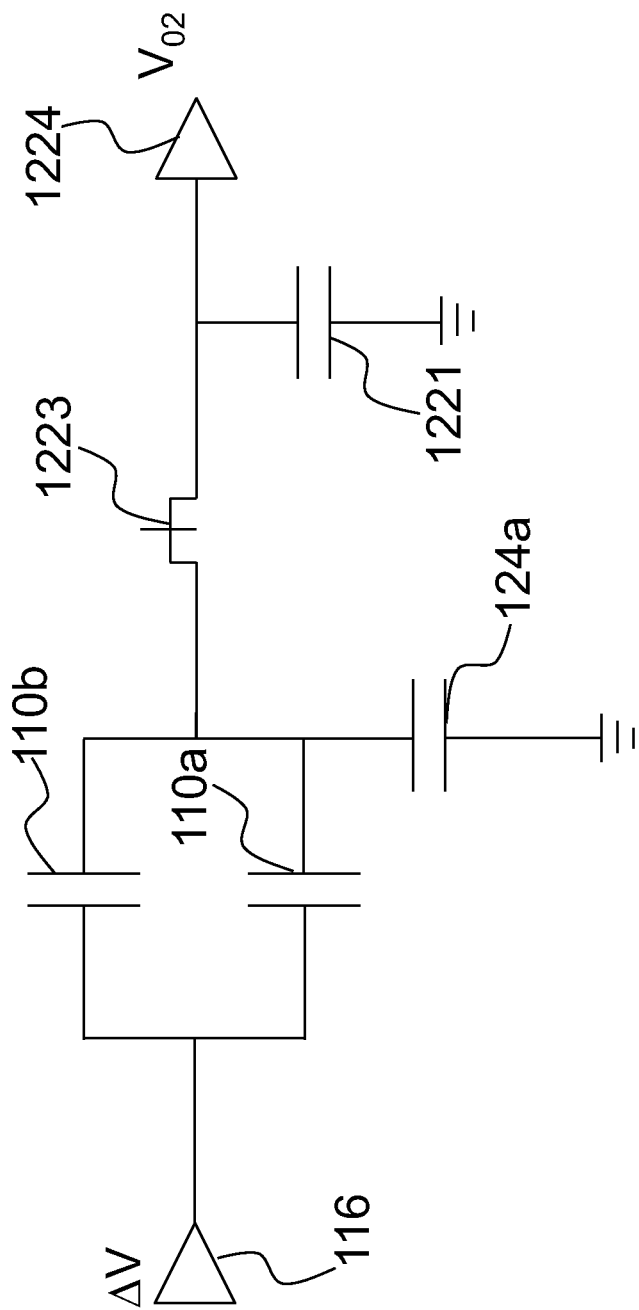
FIG. 7 shows an equivalent circuit for the second voltage term of the output voltage.
Figure 8:
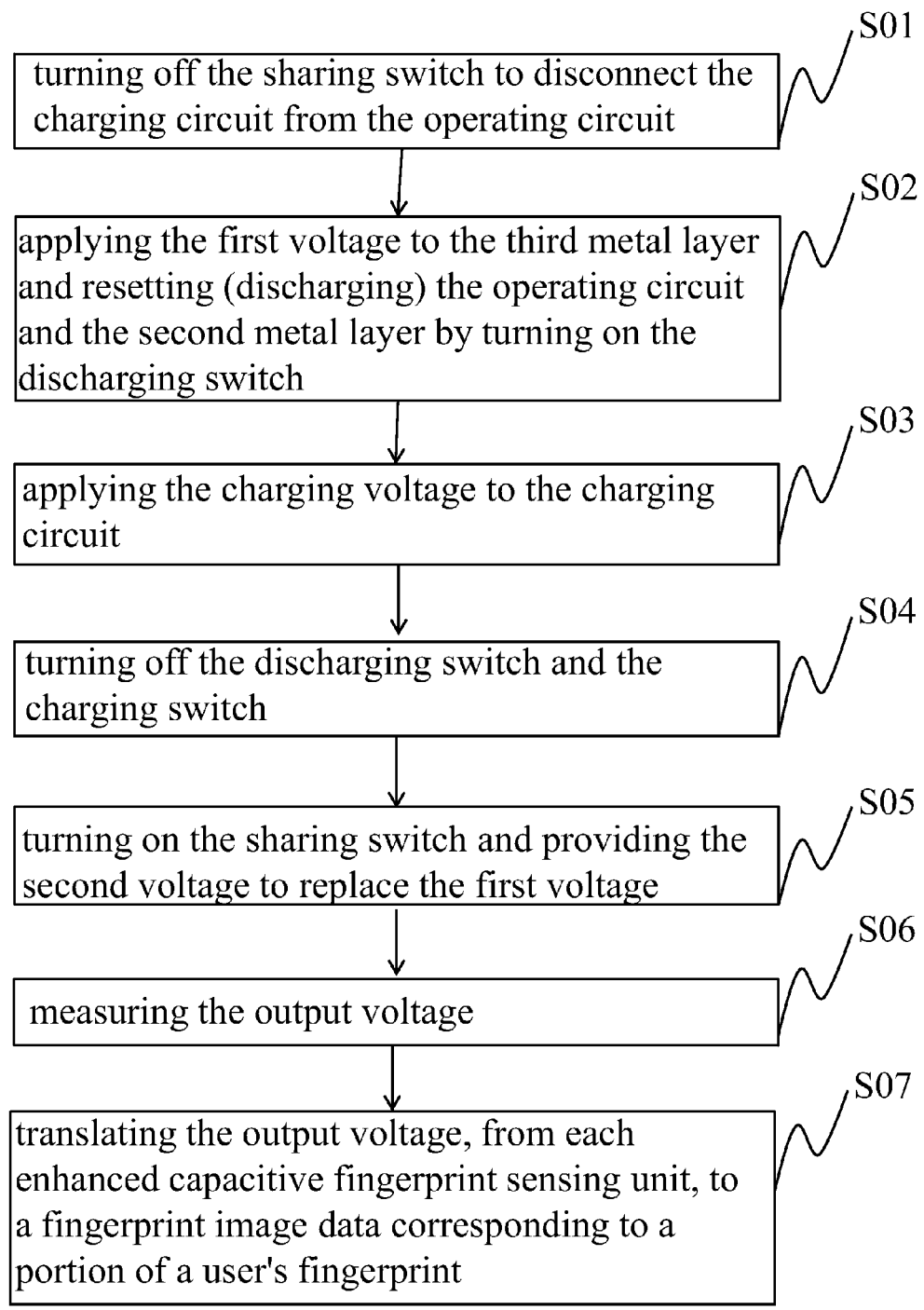
FIG. 8 is a flow chart for operating the equivalent circuit.

Please see FIG. 2 to FIG. 8. An embodiment according to the present invention is described. FIG. 2 shows a cross-sectional view of an enhanced capacitive fingerprint sensing unit 100 according to the present invention. FIG. 3 is an equivalent circuit of the enhanced capacitive fingerprint sensing unit 100. FIG. 4 illustrates the fingerprint sensing structure 110 and the corresponding equivalent capacitors located therein by showing two adjacent enhanced capacitive fingerprint sensing unit 100. FIG. 5 is a top view of an enhanced capacitive fingerprint sensor. FIG. 6 shows an equivalent circuit for the charge sharing term of the output voltage while FIG. 7 shows an equivalent circuit for the second voltage term of the output voltage. FIG. 8 is a flow chart for operating the equivalent circuit.

The enhanced capacitive fingerprint sensing unit 100 basically includes a fingerprint sensing structure 110 and a base structure 120. The fingerprint sensing structure 110 is formed above the base structure 120. The fingerprint sensing structure 110 has several substructures. They are a first inter-metal dielectric layer 111, a second metal layer 112, a second inter-metal dielectric layer 113, a third metal layer 114, and a passivation layer 115. The first inter-metal dielectric layer 111 can be made from common processes for manufacturing any inter-metal dielectric layer in an integrated circuit. Different from conventional sensing units for a fingerprint sensor, the depth of the first inter-metal dielectric layer 111 should be thick enough. The reason that it needs a thicker depth will be discussed later. As shown in FIG. 2, a first depth d1 of the first inter-metal dielectric layer 111 between adjacent metal layers is indicated. The first depth d1 should be greater than 3 μm, e.g. 5 μm.

The second metal layer 112 is formed above the first inter-metal dielectric layer 111 to work as a sensing metal plate. The second metal layer 112 forms several capacitances (capacitors, tangible or intangible) with adjacent objects. For example, as shown in FIG. 4, the second metal layer 112 and a finger 200 form a finger capacitance 110b when the finger 200 comes close to the fingerprint sensing unit 100. Namely, the second metal layer 112 and the finger 200 are components of a capacitor and whose capacitance value varies as the distance between a close-in portion of the finger 200 and the second metal layer 112 changes. Generally, the capacitance value is reversely proportional to the distance.

The second inter-metal dielectric layer 113 is formed above and around the second metal layer 112. It covers the sensing metal plate (the second metal layer 112). In order to minimize the capacitance between the third metal layer 114 and the second metal layer 112 (reasons of this will be illustrated below), a second depth d2 of the second inter-metal dielectric layer 113 between adjacent metal layers should be larger than what is conventionally implemented. The second depth d2 should be greater than 3 μm, e.g. 5 μm.

The third metal layer 114 is formed above the second inter-metal dielectric layer 113. The third metal layer 114 forms a rectangle cell with an opening located above the sensing metal plate 112. Meanwhile, it connects to a Transient Voltage Suppressor (TVS) device (not shown). The TVS device is an electronic component used to protect other sensitive electronic devices from voltage spikes induced on connected wires. The TVS device may not be necessary to be manufactured along with the enhanced capacitive fingerprint sensing unit 100 or a fingerprint sensor composed of a fingerprint sensing array of the enhanced capacitive fingerprint sensing units 100. The TVS device can be a standalone element, linked to the third metal layer 114 of every enhanced capacitive fingerprint sensing units 100. Another function of the third metal layer 114 is to receive a first voltage and a second voltage ($V_{in}$ shown in FIG. 3). The only limitation is that a threshold voltage to trigger the TVS device should be higher than that of the first voltage and/or the second voltage. (In present embodiment, the second voltage comes after the first voltage and it forms a voltage drop). Otherwise, any voltage higher than the threshold voltage will be released to avoid damaging the circuit in the base structure. Thus, the enhanced capacitive fingerprint sensing unit 100 doesn't have to include an extra metal layer to provide ESD protection. The topmost layer is a passivation layer 115. It covers the third metal layer 114 and protects the layers below from impact and scratch. The voltage change created by the first and the second voltage can be provided by an input buffer 116.

The base structure 120 has at least one first metal layer 121. The at least first metal layer 121 provides interconnection of the circuit elements such as the capacitors and switches in the base structure. With the at least one first metal layer 121, the base structure 120 forms a charging circuit 122 and an operating circuit 124. The charging circuit 122 and the operating circuit 124 are illustrated by dashed frames in the equivalent circuit in FIG. 3. Main goals of the base structure 120 are alternatively receiving a stable charging voltage ($V_{dd}$), and sharing electric charges from the charging circuit 122 to the capacitances of the operating circuit 124 and fingerprint sensing structure 110 while stopping receiving the charging voltage.

The charging circuit 122 has a charging capacitor 1221 built inside. The charging capacitor 1221 is used to store electric charges when the charging voltage is applied. One side of the charging capacitor 1221 is connected to the signal ground. Therefore, the charging capacitor 1221 will be charged to the stable voltage $V_{dd}$ during the charging stage (S03). The charging capacitor 1221 may be implemented by circuit elements such as MOS or Poly-to-Poly capacitor. The capacitance of the charging capacitor 1221 is determined by the geometry of the MOS gate or Poly silicon. Meanwhile, the other equivalent capacitances $C_x$, $C_p$ and $C_f$ which will be introduced later naturally exist when the enhanced capacitive fingerprint sensing unit 100 is formed or when the finger 200 comes close to the enhanced capacitive fingerprint sensing unit 100.

The charging circuit 122 also has two switches, a charging switch 1222 and a sharing switch 1223. When the charging switch 1222 is turned on while the sharing switch 1223 is turned off, the charging voltage will be applied to the charging circuit 122 and the charging capacitor 1221($C_r$) is charged to the charging voltage $V_{dd}$. When the charging switch 1222 is turned off while the sharing switch 1223 remains off, the charging voltage supply stops, and the charging capacitor 1221($C_r$) retains the charging voltage $V_{dd}$. The sharing switch 1223 is formed between the operating circuit 124 and the charging circuit 122. It switches operations of receiving a charging voltage (as mentioned above, when the charging switch 1222 is turned on) and sharing electric charge. Namely, when the sharing switch 1223 is turned off, the charging circuit 122 and the operating circuit 124 are isolated from each other. On the other hand, when the sharing switch 1223 is turned on, the charging circuit 122 and the operating circuit 124 are connected to each other and electric charges can move there between, so that a new balanced distribution of electric charges is achieved.

The charging circuit 122 further includes a buffer 1224. The buffer 1224 is used to isolate the sensing unit 100 from other processing circuits (not shown) and to deliver output voltage $V_{out}$ to the subsequent processing circuit (not shown). Usually, the buffer 1224 is made of "voltage follower".

The operating circuit 124 is a general term for the elements in the base structure 120 but not belong to the charging circuit 122. In other words, any element in the base structure 120 separated from the charging circuit 122 by the sharing switch 1223 is a part of the operating circuit 124. Functions of the operating circuit 124 will be illustrated later with the operation of the enhanced capacitive fingerprint sensing unit 100. The operating circuit 124 has a discharging switch 1241. The discharging switch 1241 is used for resetting (discharging) the voltage of the operating circuit 124 and that of the second metal layer 112 to signal ground when the sharing switch 1223 is off. As mentioned above, several capacitances naturally exist. In order to have a better understanding of the operation of the enhanced capacitive fingerprint sensing unit 100, all these capacitances are embodied by equivalent capacitors. A parasitic capacitance exists in the operating circuit 124 (actually, the parasitic capacitance is formed between the sensing metal plate 112 and the at least one first metal layer 121), and a cross capacitance is formed between the third metal layer 114 and the sensing metal plate 112. Therefore, a parasitic capacitor 124a and a cross capacitor 110a are used for illustration, respectively.

When the finger 200 approaches the passivation layer 115, a signal capacitance is formed between the finger 200 and the third metal layer 114. Meanwhile, a finger capacitance is formed between the finger 200 and the sensing metal plate 112. Similarly, a signal capacitor 110c and a finger capacitor 110b are used for illustration, respectively. FIG. 4 illustrates the fingerprint sensing structure 110 and each of the equivalent capacitors located therein by showing two adjacent enhanced capacitive fingerprint sensing unit 100 (separated by dashed lines).

It should be emphasized that a fingerprint sensing array 10 (or fingerprint sensing area), which is enclosed by a dashed frame in FIG. 5, is formed by arranging the enhanced capacitive fingerprint sensing units 100 in an array with the same structure adjacent to each other at the same level, and the third metal layers 114 of all enhanced capacitive fingerprint sensing units 100 are connected. Hence, a metal grid 11 is formed. Considering that the total area of the connected third metal layer 114 is much larger than the individual sensing plate (the second metal layer 112), the capacitance of the signal capacitor 110c is much larger than that of other equivalent capacitors in the fingerprint sensing structure, i.e. $C_s \gg C_x$, $C_f$ or $C_p$. Thus, the signal capacitor 110c can be considered as short circuit and can be ignored in the subsequent discussion. Please see FIG. 5. FIG. 5 is a top view of an enhanced capacitive fingerprint sensor 1. The present invention can be applied to the enhanced capacitive fingerprint sensor 1 which is composed of the fingerprint sensing array 10 mentioned above and a number of Input/output (I/O) pads 150. The I/O pads 150 are linked to the fingerprint sensing array 10 for connecting with external circuitry.

The enhanced capacitive fingerprint sensing unit 100 works with the following procedure which consists of distinct and repeated stages. Please refer to FIG. 8. There are three main stages: a setup stage, a charging stage, and a sharing stage. At the setup stage, the sharing switch 1223 is turned off (S01) so that the charging circuit 122 and the operating circuit 124 are disconnected.

In the charging stage, first, the first voltage $V_1$ is applied to the third metal layer 114, and the operating circuit 124 and the second metal layer 112 are discharged to signal ground (resetting) by turning on the discharging switch 1241 (S02). Then, the charging voltage is applied to the charging circuit 122 by turning on the charging switch 1222 (S03). In the last step of the charging stage, the discharging switch 1241 and the charging switch 1222 are turned off (S04). It should be noticed that the sequence of S02 and S03 may be swapped, or the two steps may occur at the same time. At the end of the charging stage, the charging capacitor 1221 is charged to the charging voltage $V_{dd}$, while the equivalent capacitors are charged to the first voltage $V_1$.

Following the charging stage is the sharing stage. During the sharing stage, the following operations occur substantially at the same time: turning on the sharing switch 1223 and providing the second voltage to replace the first voltage (S05). In fact, one may occur a little earlier. The order doesn't affect the result. When the voltage at the buffer 1224 is stable, the output voltage $V_{out}$ is measured. It should be noticed that when the second voltage takes place, a voltage variation is obtained in the charging circuit 122. It is obvious that the distribution of electric charges in the enhanced capacitive fingerprint sensing unit 100 will change, further influencing the output voltage $V_{out}$. Actually, the influence of the output voltage comes from two sources, the sharing of electric charges and the voltage change from the input buffer 116 (difference between the second voltage and the first voltage). $V_{out}$ can be a sum of voltage values contributed from the two sources. It will be illustrated below.

To illustrate the sharing stage more clearly, an equivalent circuit is depicted in FIG. 3. $V_{dd}$ is a value of the charging voltage, $V_1$ and $V_2$ are values of the first and of the second voltage, respectively, $C_r$ is a capacitance value of the charging capacitor, $C_p$ is a value of the parasitic capacitance, $C_f$ is a value of the finger capacitance, and $C_x$ is a value of the cross capacitance, the output voltage $V_{out}$ is the voltage across $C_r$, measured by the output buffer 1224.

$$V_{out} = \frac{C_r}{C_p + C_x + C_f + C_r} V_{dd} + \frac{C_f + C_x}{C_p + C_x + C_f + C_r}(V_2 - V_1).$$

By the theory of linear circuit, the net effect of the charge sharing through the sharing switch 1223 and the driving voltage change from $V_1$ to $V_2$ is the sum of the voltages of which charge sharing through the sharing switch 1223 and the driving voltage change from $V_1$ to $V_2$ are applied separately.

An equivalent circuit of the charge sharing through the sharing switch (without the voltage change from $V_1$ to $V_2$) is depicted in FIG. 6. An equivalent circuit of the voltage drop from $V_1$ to $V_2$ on input buffer (without $C_r$ being charged to $V_{dd}$) is depicted in FIG. 7. Let $V_{01}$ represents the voltage change of $V_{out}$ when the sharing switch is turned on at the sharing stage, but the input driver remains at the same voltage $V_1$, and $V_{02}$ represents the voltage change of $V_{out}$ when the input buffer changes from $V_1$ to $V_2$ while charging capacitor is not charged to $V_{dd}$. The net result of $V_{out}$ will be:

$$V_{out} = V_{01} + V_{02}$$

where $$V_{01} = \frac{C_r}{C_p + C_x + C_f + C_r} V_{dd}$$

and $$V_{02} = \frac{C_f + C_x}{C_p + C_x + C_f + C_r}(V_2 - V_1)$$

For the naturally formed capacitance $C_p$ and $C_x$, their values are determined according to the physical structure and material of the enhance capacitive fingerprint sensing unit 100. The variable finger capacitance $C_f$ is determined by the distance of from the second metal layer 112 to the valley or ridge portion of the fingertip that touches the sensor. The charging capacitance $C_r$ is formed by a circuit component inside the at least one first metal layer 121 which can be determined by the geometry of the circuit element (such as MOS transistor or Poly-to-Poly capacitor) which implements charging capacitance $C_r$. In order to justify our structure design of the enhanced capacitive fingerprint sensing unit 100, the first derivative of $V_{out}$ with respect to $C_f$ should be given. Therefore, we have:

$$\frac{dV_{out}}{dC_f} = \frac{dV_{01}}{dC_f} + \frac{dV_{02}}{dC_f} = \\ -V_{dd} \cdot \frac{C_r}{(C_p + C_x + C_f + C_r)^2} + (V_2 - V_1) \cdot \cdot \frac{C_p + C_r}{(C_p + C_x + C_f + C_r)^2}$$

wherein $$\frac{dV_{01}}{dC_f} = -V_{dd} \cdot \frac{C_r}{(C_p + C_x + C_f + C_r)^2}$$

and $$\frac{dV_{02}}{dC_f} = \frac{d}{dC_f}(V_2 - V_1) \cdot \left(1 - \frac{C_p + C_r}{C_p + C_x + C_f + C_r}\right) =$$

$$(V_2 - V_1) \cdot \frac{C_p + C_r}{(C_p + C_x + C_f + C_r)^2}.$$

In order to improve the sensitivity, which can be represented as $$\left|\frac{dV_{out}}{dC_f}\right|,$$

the first term $$\frac{dV_{01}}{dC_f}$$

and the second term $$\frac{dV_{02}}{dC_f}$$

must have the same sign; in other words, if $V_{dd}$ is a positive value, then $V_2-V_1$ must be negative, which means $V_1>V_2$. Also it is obvious that the values of $C_p$ and $C_x$ are preferred to be reduced so that the sensitivity, $$\left|\frac{dV_{out}}{dC_f}\right|,$$

can be increased. To achieve this goal, the depth of the first IMD (inter-metal dielectric) layer 111 and second IMD layer 113 needs to be increased since the capacitance is reversely proportional to the distance between two conductive plates. By experiments, the first depth d1 and the second depth d2 should be greater than 3 μm. Since thickness of IMD in standard CMOS process is below 1 μm, this requirement may take special deposition process during manufacturing.

At the end of the sharing stage, when the distribution of electric charges reaches an equilibrium, the output voltage may be measured (S06). Since position of ridge and valley area of a finger above one enhanced capacitive fingerprint sensing unit 100 is reflected by the given output voltage, finally, translate the output voltage, sequentially from each enhanced capacitive fingerprint sensing unit 100, to a fingerprint image data corresponding to a portion of a user's fingerprint (S07).

It should be noticed that the voltages described above are relative voltages at different circuit nodes. If the value of the charging voltage $V_{dd}$ is positive, resetting process of the second metal layer 112 is to discharge to 0V or the signal ground. In this case, the second voltage after the first voltage forms a negative going step, and the voltage change from $V_1$ to $V_2$ is a voltage drop. It may be possible for the value of the charging voltage to be 0V. Under this condition, the resetting process of the second metal layer 112 is to charge to a positive value of voltage. In this case, the second voltage after the first voltage forms a positive going step, and the voltage change from $V_1$ to $V_2$ is a voltage rise. The 0V charging voltage with voltage positive input voltage change mentioned above is an alternative for operating the enhanced capacitive fingerprint sensing unit 100.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An enhanced capacitive fingerprint sensing unit, comprising:
a base structure, having at least one first metal layer and forming a charging circuit and an operating circuit, for alternatively receiving a charging voltage and sharing electric charges from the charging circuit to a capacitance of the operating circuit while stopping receiving the charging voltage, and
a fingerprint sensing structure, formed above the base structure, comprising:
a first inter-metal dielectric layer, having a first depth greater than 3 μm;
a second metal layer, formed above the first inter-metal dielectric layer and forming a sensing metal plate;
a second inter-metal dielectric layer, formed above and around the second metal layer, covering the sensing metal plate and having a second depth greater than 3 μm;
a third metal layer, formed above the second inter-metal dielectric layer, forming a rectangle cell with an opening located above the sensing metal plate and connecting to a Transient Voltage Suppressor (TVS) device, for receiving a first voltage and a second voltage; and
a passivation layer, covering the third metal layer,
wherein a threshold voltage to trigger the TVS device is higher than the first voltage and/or the second voltage; the base structure shares electric charges from the charging circuit to capacitances of the fingerprint sensing structure while stops receiving the charging voltage.

2. The enhanced capacitive fingerprint sensing unit according to claim 1, wherein a charging capacitor is built in the charging circuit for storing electric charges when the charging voltage is received and a parasitic capacitance exists in the operating circuit, and a cross capacitance is formed between the third metal layer and the sensing metal plate.

3. The enhanced capacitive fingerprint sensing unit according to claim 2, wherein when a finger approaches the passivation layer, a signal capacitance is formed between the finger and the third metal layer and a finger capacitance is formed between the finger and the sensing metal plate.

4. The enhanced capacitive fingerprint sensing unit according to claim 3, wherein a voltage variation is obtained in the charging circuit when the second voltage takes place, the charging voltage stops being applied and the sharing switch turns on.

5. The enhanced capacitive fingerprint sensing unit according to claim 4, wherein the output voltage is $$V_{out} = \frac{C_r}{C_p + C_x + C_f + C_r} V_{dd} + \frac{C_f + C_x}{C_p + C_x + C_f + C_r}(V_2 - V_1)$$

wherein $V_{out}$ is a value of the output voltage, $V_{dd}$ is a value of the charging voltage, $V_1$ and $V_2$ are values of the first and of the second voltage, respectively, $C_r$ is a capacitance value of the charging capacitor, $C_p$ is a value of the parasitic capacitance, $C_f$ is a value of the finger capacitance, and $C_x$ is a value of the cross capacitance.

6. The enhanced capacitive fingerprint sensing unit according to claim 5, wherein a discharging switch is formed in the operating circuit, for resetting the voltage of the operating circuit and that of the second metal layer to signal ground when the sharing switch is off.

7. A method to acquiring a fingerprint using the enhanced capacitive fingerprint sensing unit according to claim 6, comprising the steps of:
   turning off the sharing switch to disconnect the charging circuit from the operating circuit;
   applying the first voltage to the third metal layer and resetting the operating circuit and the second metal layer by turning on the discharging switch;
   applying the charging voltage to the charging circuit;
   turning off the discharging switch and the charging switch;
   turning on the sharing switch and providing the second voltage to replace the first voltage;
   measuring the output voltage; and
   translating the output voltage, from each enhanced capacitive fingerprint sensing unit, to a fingerprint image data corresponding to a portion of a user's fingerprint.

8. The enhanced capacitive fingerprint sensing unit according to claim 1, wherein a sharing switch is formed between the operating circuit and the charging circuit, for switching operations of receiving the charging voltage and sharing electric charges.

9. A fingerprint sensor, comprising:
   a plurality of enhanced capacitive fingerprint sensing units according to claim 1 to form a fingerprint sensing array, wherein the same structure of the base structures or the fingerprint sensing structures are adjacent to each other at the same level and the third metal layers of all fingerprint sensing units are connected so that a metal grid is formed.

\* \* \* \* \*